INVENTOR.
TENNY LODE
BY
Braddock and Braddock
ATTORNEYS

INVENTOR.
TENNY LODE
BY
Dugger Braddock Johnson & Westman
ATTORNEYS

April 25, 1967 T. LODE 3,316,474

THERMOELECTRIC TRANSFORMER

Filed May 21, 1964

3 Sheets-Sheet 3

INVENTOR
TENNY LODE
BY
Dugger Braddock Johnson & Westman
ATTORNEYS

United States Patent Office 3,316,474
Patented Apr. 25, 1967

3,316,474
THERMOELECTRIC TRANSFORMER
Tenny Lode, Mankato, Minn., assignor to Rosemount Engineering Company, Minneapolis, Minn., a corporation of Minnesota
Filed May 21, 1964, Ser. No. 379,775
14 Claims. (Cl. 321—1.5)

This invention relates to a device for transferring electrical energy from one or more driving circuits to one or more driven circuits. Such a device will be particularly useful in transferring energy which is unidirectional in nature and the specification refers to the input energy as though it were flowing in one direction only. It is to be understood, however, that the transformers of the invention are completely reversible in nature and that a reversal in polarity of input potential will result in a reversal in polarity of output potential. Because of this factor, such transformers can, in some situations, perform useful functions where other than unidirectional potentials are applied to the driving circuits.

A device made according to the present invention will find use as a D.C. voltage step-up transformer for the operation of electronic equipment from low voltage batteries; will find use for the transformation of unidirectional electrical energy into a higher current, lower voltage form; will find use as a means of electrically isolating a power supplying circuit and a power consuming circuit from each other; will find use as a means for generating a constant, disturbance free, unidirectional voltage or current; will find use in detecting direct current components in lines carrying alternating current; and will find use in many other ways.

A first basic form of thermoelectric transformer constructed according to the present invention will include a primary circuit in which a number of elements of one thermoelectric material are joined to a number of elements of another thermoelectric material having a non-zero Seebeck coefficient with respect to the first material; and a secondary circuit in which a number of elements of one thermoelectric material are joined with a number of elements of another thermoelectric material having a non-zero Seebeck coefficient with respect to the first material; and in which a first set of junctions of the secondary circuit is in close thermal proximity to a first set of junctions of the primary circuit, and a second set of junctions of the secondary circuit is in close thermal proximity to a second set of junctions of the primary circuit. In operation, a unidirectional electric current is passed through the primary circuit thereby causing a heating of one set of primary circuit junctions and a cooling of the other. The heating and cooling of these sets of primary circuit junctions will also heat and cool the corresponding thermally close sets of junctions of the secondary circuit thereby generating a thermoelectric voltage in the secondary circuit.

In a second modified form of the invention, junction blocks of a material having good electrical conducting and good thermal conducting properties are positioned between each of the junctions of the first and second thermoelectric materials to facilitate heat transfer between the primary and secondary junctions. A separate heat transfer block of material of higher thermal conductivity situated in thermally conductive contact with but in electrically insulated relationship to each of these junction blocks of a particular set in both the primary and secondary circuits will further facilitate heat transfer between the circuits.

In a third form of the invention, a first set of junctions of the primary circuit will be in close thermal proximity to an associated first set of junctions of the secondary circuit, but a second set of junctions of each of the primary and secondary circuits will be in close thermal proximity to a heat sink which will tend to maintain the temperature differential between the second set of primary junctions and the second set of secondary junctions at zero or at a substantially constant value.

Figure 1:
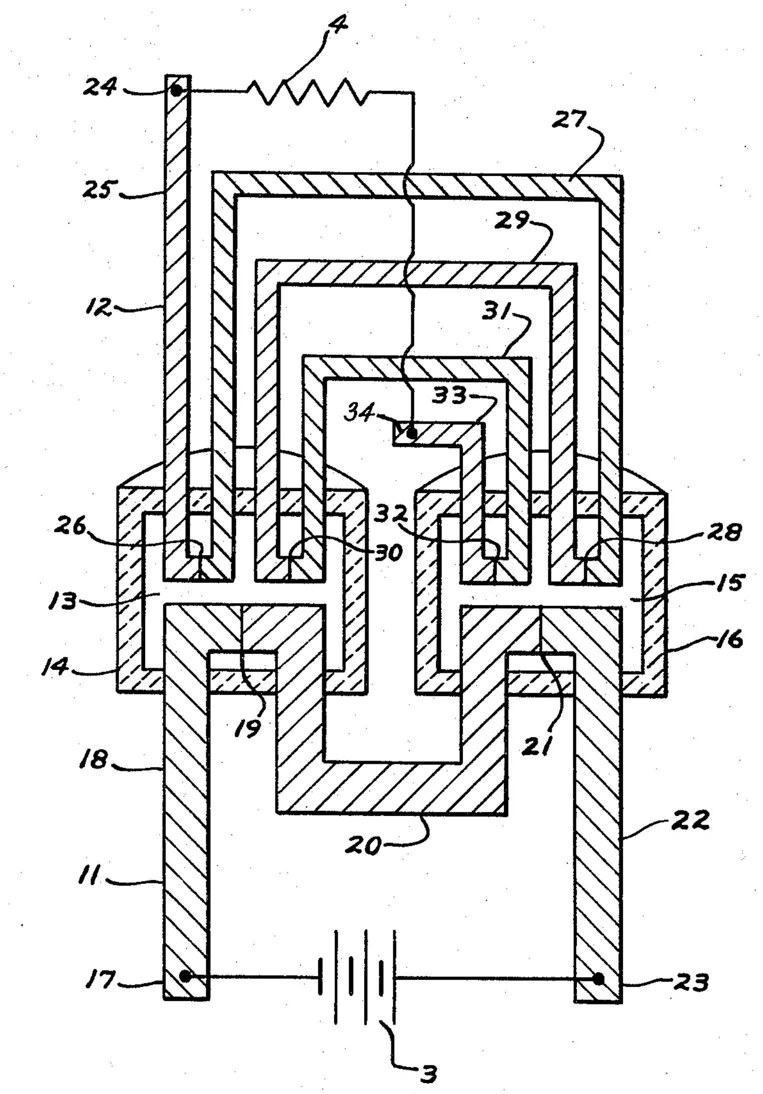
FIG. 1 is a diagrammatic representation of a first basic form of a thermoelectric transformer made according to the present invention.

Referring to FIG. 1 of the drawings and numerals of reference thereof, a thermoelectric transformer made according to a first form of the invention includes a primary circuit 11, a secondary circuit 12, a hot junction space 13 surrounded by an insulating shell 14, and a cold junction space 15 surrounded by an insulating shell 16. These junction spaces 13 and 15 can be filled with air or with any other suitable substance which is an electrical insulator and which has relatively good thermal conducting properties. The better this substance conducts and transmits heat, the higher will be the efficiency of the device.

As shown, primary circuit 11 includes a first input terminal 17, an electrically conducting segment 18 of a first thermoelectric material, junction 19, electrically conducting segment 20 of a second thermoelectric material having a non-zero Seebeck coefficient with respect to said first material, junction 21, electrically conducting segment 22 of the first thermoelectric material, and a second input terminal 23, all in series connection. A source of unidirectional electromotive force, such as battery 3 is connected between the terminals 17 and 23.

The secondary circuit 12 includes a first secondary terminal 24, electrically conducting segment 25 of a third thermoelectric material, junction 26, electrically conducting segment 27 of a fourth thermoelectric material having a non-zero Seebeck coefficient with respect to said third material, junction 28, electrically conducting segment 29 of said third thermoelectric material, junction 30, electrically conducting segment 31 of said fourth thermoelectric material, junction 32, electrically conducting segment 33 of said third thermoelectric material, and a secondary terminal 34, all in series connection. A load, such as resistor 4, is electrically connected between terminals 24 and 34.

The choice of the particular materials for the construction of a thermoelectric transformer incorporating the present invention depends upon the particular application and the characteristics desired. It is to be understood that the first and second thermoelectric materials referred to in the primary of the circuit described above could be the same materials as referred to as the third and fourth thermoelectrical materials described in connection with the secondary of the transformer. The only requirement here is that the materials used adjacent each other have a mon-zero Seebeck coefficient with respect to each other. Certain materials known as semi-conductors possess combinations of properties which are particularly desirable for thermoelectric devices and may be employed for the construction of thermoelectric transformers as disclosed in this specification. For example, the two types of materials may be P doped lead telluride and N doped lead telluride. Other suitable thermoelectric materials are known. These are not all semiconductors.

While two thermoelectric materials having non-zero Seebeck coefficients with respect to each other are referred to throughout this specification, more than two can also be combined to form a transformer within the spirit of the invention and the scope of the claims which follow. Thus the first thermoelectric material and the third can have properties such that current flow in one direction will cause the junction between the first and second material to heat while the junction between the second and third will cool.

It is known that when an electric current is passed through a junction of two dissimilar conducting materials, the current flow will cause a heating or cooling of the junction depending on the nature of the specific materials. This phenomenon is known as the Peltier effect. In the primary circuit 11, conducting segments 18 and 22 are of a first thermoelectric material, and conducting segment 20 is of a second thermoelectric material. If the conducting materials of primary circuit 11 are chosen so that an electron flow from primary terminal 17 to primary terminal 23 causes a heating of junction 19, this same electron flow will also cause a cooling junction 21. Thus, if primary circuit 11 is connected to a unidirectional voltage source such that terminal 17 is maintained at a negative potential with respect to terminal 23, junction space 13 will be heated by the current passing through primary circuit 11, and junction space 15 will be correspondingly cooled.

This Peltier heating and cooling will be in addition to whatever ohmic heating occurs due to the flow of current through the effective resistance of the various elements making up the circuit.

It is known that when a conducting circuit includes two or more junctions between dissimilar conductors, and a temperature difference is maintained between these junctions, an electromotive force is generated in the circuit. This is known as the Seebeck effect. In the secondary circuit, conducting segments 25, 29, and 33 are of a third thermoelectric material, and conducting segments 27 and 31 are of a fourth thermoelectric material. These materials are chosen such that heating of junctions 26 and 30 with respect to the other secondary circuit junctions 28 and 32 will cause secondary terminal 24 to become electrically positive with respect to terminal 34. From this, and the secondary junction arrangement, it is seen that a heating of junctions 26 and 30, and a cooling of junctions 28 and 32 will contribute cumulatively to the development of a positive electrical potential at terminal 24 with respect to terminal 34. Since secondary junctions 26 and 30 are heated by primary junction 19, and secondary junctions 28 and 32 are cooled by primary junction 21, the result is a transformation of unidirectional electrical energy applied at terminals 17 and 23 of primary circuit 11 into a unidirectional electrical potential across terminals 24 and 34 of secondary circuit 12.

The magnitude of the Peltier heating and cooling is approximately proportional to the magnitude of the associated currents. Hence, within the limits of the efficiency of the heat transfer, the magnitude of the difference in the temperatures of the junction spaces 13 and 15 will be approximately proportional to the magnitude of the current passing between primary terminals 17 and 23. The magnitude of the Seebeck generated voltage is approximately proportional to the magnitude of the associated temperature difference. Hence, the magnitude of the thermoelectrically generated voltage between secondary terminals 24 and 34 will be approximately proportional to the difference in the temperatures of the junction spaces 13 and 15 and hence proportional to the current flowing between primary terminals 17 and 23. Thus, the invention as disclosed in FIG. 1 functions as a transformer in which the magnitude and polarity of the output voltage or current will be approximately proportional to the magnitude and polarity of the input voltage or current.

As previously stated, transformers of the invention are completely reversible. By applying a potential to the circuit previously described as the "secondary circuit," a potential is obtained across the former "primary" terminals. By reversing the polarity of the potential at the primary, a reversed polarity is obtained at the secondary as soon as the change from hot to cold and cold to hot has been transferred from the primary junctions to the secondary junctions. When an alternating potential is applied to the primary of a transformer of the invention, the secondary potential developed will be a filtered average of that applied at the primary. For a primary potential of 60 cycles per second, for example, the secondary potential developed is essentially zero because the time lag presently inherent in the heat transfer process results in each of the sets of junctions of the secondary remaining at an approximately constant temperature. As the frequency of the alternating input potential is reduced, a point is reached where the secondary output potential responds to that of the input and reverses in polarity at the same frequency as that applied to the input. The response of the secondary circuit at a given frequency is a function of the design of the transformer and of the thermal characteristics of the components; but secondary polarity reversal can be observed in transformers of the invention when an alternating potential on the order of one cycle per minute is impressed on the primary.

When electrical energy applied to the primary circuit is a sum of an alternating component at a frequency above the response time of the transformer of the invention and a unidirectional or low frequency component; the transformer will pass the unidirectional or low frequency component but will suppress the high frequency component.

The more efficient thermoelectric materials presently available are not particularly good conductors of thermal energy. Also, the operation of the device of the invention depends to some extent on temperature differences between opposite ends of the thermoelectric segments, so that high thermal conductivity in the segments may not be desirable. However, since the absorption and generation of heat in transformers such as illustrated in FIG. 1 takes place primarily along internal surfaces of primary junctions such as 19 and 21, this heat gain and loss is not readily and efficiently transmitted to the secondary internal junction surfaces such as 26, 30, 28 and 32.

In order to provide for greater efficiency of heat transfer in a second form of the invention, junction blocks are placed between the junctions of the dissimilar thermoelectric segments. These junction blocks are each of a material which is a good electrical conductor and is a good thermal conductor. Copper and aluminum are two materials which serve well for this purpose. There are many others.

Figure 2:
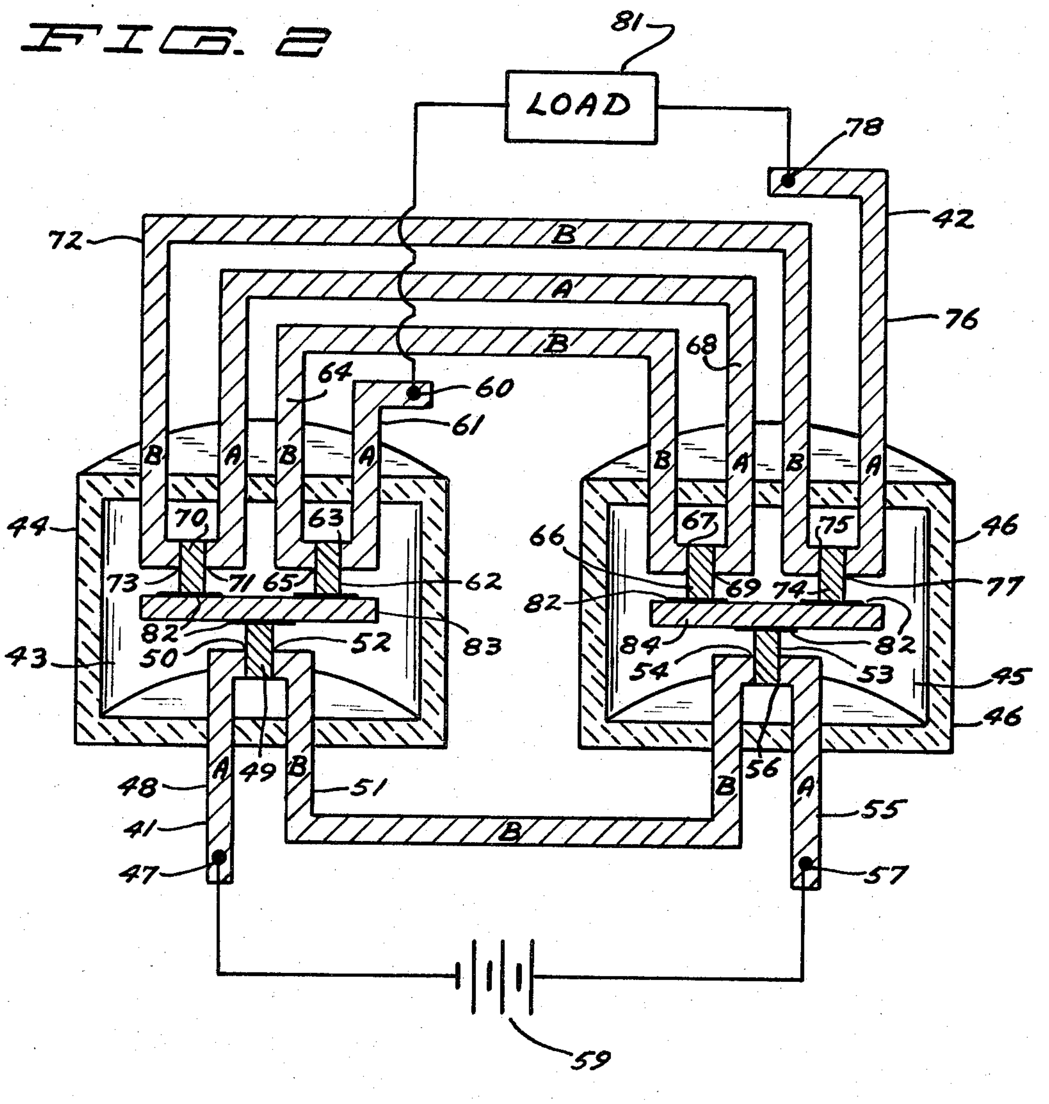
FIG. 2 is a diagrammatic representation of a second modified form of thermoelectric transformer made according to the invention.

Referring now to FIG. 2, a thermoelectrical transformer made according to a second form of the present invention includes a primary circuit 41, a secondary circuit 42, a hot junction space 43 surrounded by an insulating shell 44, and a cold junction space 45 surrounded by an insulating shell 46.

As shown, primary circuit 41 includes a first input terminal 47, a segment 48 of thermoelectric material, a junction block 49 of material with good electrical and good thermal conductivity which joins segment 48 at 50, a segment 51 of thermoelectric material which joins junction block 49 at 52, a junction block 53 which joins segment 51 at 54, a segment 55 which joins junction block 53 at 56, and a second input terminal 57. Segments 48 and 55 are of a first thermoelectric material (A) and segment 51 is of a second thermoelectric material (B) having a non-zero Seebeck coefficient with respect to said first material. Asource of unidirectional electromotive force such as battery 59 is connected between the first and second terminals 47 and 57.

The secondary circuit 42 includes a first secondary terminal 60, a segment 61 of thermoelectric material, a junction block 62 of material having good electrical and good thermal conductivity which joins segment 61 at 63, a segment 64 of thermoelectric material which joins junction block 62 at 65, a junction block 66 which joins segment 64 at 67, a segment 68 of thermoelectric material which joins block 66 at 69, a junction block 70 which joins segment 68 at 71, a segment 72 which joins block 70 at 73, a junction block 74 which joins segment 72 at 75, a segment 76 which joins block 75 at 77, and a secondary terminal 78. A load 81 is electrically connected between secondary terminals 60 and 78.

Segments 61, 68 and 76 are of a first thermoelectric material (A), and segments 64 and 72 are of a second thermoelectric material (B) having a non-zero Seebeck coefficient with respect to said first material. Whether these first and second thermoelectric materials (A and B) in the secondary circuit are the same materials as the materials referred to as the first and second thermoelectric materials (A and B) in the primary circuit of the transformer is a matter of choice and design; and use of the same materials in the secondary as in the primary is not at all necessary in the operation of thermoelectric transformers of the invention.

The algebraic sum of the heats generated at the junctions 50 and 52 in FIG. 2 will be equivalent to the heat generated at the junction 19 in FIG. 1, but this heat will be much more easily transmitted to the secondary junctions inasmuch as it will be readily conducted through the junction blocks. Similarly the algebraic sum of the heat absorbed at the junctions 54 and 56 in the device of FIG. 2 will correspond to the heat absorbed at the junction 21 in FIG. 1. Further, the algebraic sums of heat gained at the junctions 63 and 65 and at the junctions 71 and 73 in FIG. 2 will correspond with the heat gained at the junctions 26 and 30 in FIG. 1, respectively; while the algebraic sums of the heat lost at junctions 67 and 69 and at junctions 75 and 77 in FIG. 2 will correspond with the heat lost at the junction 28 and 32 of the device of FIG. 1, respectively.

Each of the junction blocks has an electrical insulator 82 intimately in contact with its outer end surface, and a heat transfer block 83 is situated in intimate contact with the outer surface of each of these insulators 82 of the blocks 49, 62 and 70, while a heat transfer block 84 is situated in intimate contact with the outer surface of the insulators 82 of junction blocks 53, 66 and 74.

The insulating materials 82 can be of any suitable substance having good electrical insulating properties and having relatively good properties of thermal conductance. Mica is one such material which is satisfactory.

These heat transfer blocks are to be of material having good thermal conductivity. For example, silver or copper or aluminum are satisfactory.

In operation, the voltage impressed by battery 59 on the primary circuit 41 causes heat to be generated and absorbed at the junctions adjacent junction blocks 49 and 53 respectively. This causes thermal conduction of heat from and to these blocks to blocks 62 and 70 and from blocks 66 and 74. This conduction is through heat transfer blocks 83 and 84, respectively, and through insulating sheets 82. This results in generation of an electrical potential across the load 81 in the manner described in connection with the first form of the invention.

A transformer made according to a third for of the invention utilizes the principles of the first and second forms, but illustrates that close thermal proximity is necessary between only a first set of primary and secondary junctions if a second set of primary junctions and a second set of secondary junctions are each in close thermal proximity to a heat sink.

Figure 3:
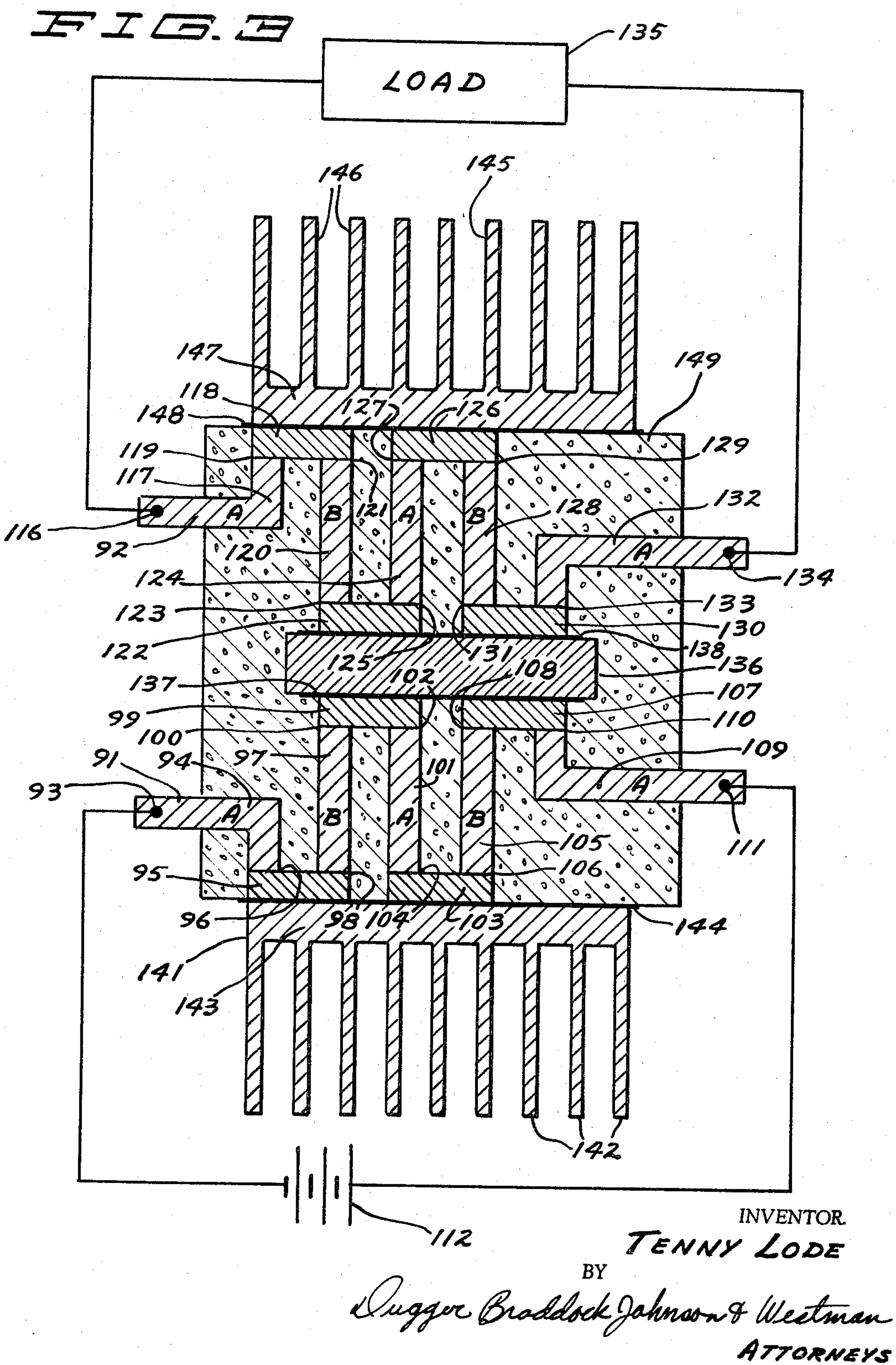
FIG. 3 is a diagrammatic representation of a third form of thermoelectric transformer made according to the invention.

Referring now to FIG. 3 of the drawings, a thermoelectric transformer made according to a third form of the invention includes a primary circuit 91 and a secondary circuit 92.

As shown, the primary circuit 91 includes a first input terminal 93, a segment 94 of thermoelectric material, a junction block 95 which joins segment 94 and 96, a segment of thermoelectric material 97 which joins junction block 95 at 98, a junction block 99 which joins segment 97 at 100, a segment 101 which joins block 99 at 102, a junction block 103 which joins segment 101 at 104, a segment 105 which joins block 103 at 106, a junction block 107 which joins segment 105 at 108, a segment 109 which joins block 107 at 110, and a second input terminal 111. A source of unidirectional electromotive force such as bettery 112 is connected across first and second input terminals 93 and 111.

Thermoelectric segments 94, 101 and 109 are of a first thermoelectric material (A), and thermoelectric segments 97 and 105 are of a second thermoelectric material (B) having a non-zero Seebeck coefficient with respect to said first material.

The secondary circuit 92 includes first secondary terminal 116, a segment 117 of thermoelectric material, a junction block 118 which joins segment 117 at 119, a segment of thermoelectric material 120 which joins block 118 and 121, a junction block 122 which joins segment 120 at 123, segment 124 which joins block 122 at 125, a junction block 126 which joins segment 124 at 127, a segment 128 which joins block 126 at 129, a junction block 130 which joins segment 128 at 131, segment 132 which joins block 130 at 133, and a second secondary terminal 134. A load 135 is connected between the first and second secondary terminals 116 and 134.

Thermoelectric segments 117, 124 and 132 are of a first thermoelectric material (A), while segments 120 and 128 are of a second thermoelectric material (B).

In this third form of the invention, the junction blocks 99 and 107 of the primary circuit 91 are situated in close thermal proximity to the junction blocks 122 and 130 of the secondary circuit 92 by the use of a heat transfer block 136 which is in thermally conductive relationship to each of these junction blocks. This heat transfer block can be of any material having a high thermal conductivity. Block 136 is insulated from each of the junction blocks 99 and 107 by a sheet 137 having good electrical insulating properties and good heat conducting properties. A similar electrical insulating sheet 138 separates the block 136 from blocks 123 and 130.

Junction blocks 95 and 103 of the primary circuit 91 are in close thermal proximity to radiating fin assembly 141 which assembly includes radiating fins 142 and heat transfer block 143 which is integral with the fins 142. Block 143 is situated in initimate contact with an electrical insulating, heat conductive sheet 144 which is in intimate contact with block 95 and 103.

Similarly, the junction block 118 and 126 of the secondary circuit 92 are situated in closed thermal proximity to radiating fin assembly 145 which consists of radiating fins 146 and heat transfer block 147. Block 147 is integral with fins 145 and is situated in intimate contact with electrical insulating, heat conductive sheet 148. This sheet 148 is also in intimate contact with the outer surface of each of the blocks 118 and 126.

In order to minimize conduction and convention losses, the entire assembly with the exception of the outer terminal ends of segments 94, 109, 117 and 132, and with the exception of the radiating fin assemblies 141 and 145 are shown as being encased in and intimate contact with a body 149 of material having good electrical and thermal insulating properties. Expanded polystyrene foam and many other such foams are satisfactory for this purpose.

Assume that the first thermoelectric material (A) and the second thermoelectric material (B) are so associated with each other in the primary circuit 91 of the device of the third form of the invention that the battery 112 will cause a current flow such that the junction blocks 95 and 103 are heated and the junction blocks 99 and 107 are cooled. Assume further that the radiating fin assemblies 141 and 145 are exposed to the atmosphere in adjacent relationship to each other so that the temperature at which the fin assembly 141 tends to maintain the blocks 95 and 103 of the primary circuit is the same temperature at which the fin assembly 145 tends to maintain the junction blocks 118 and 126 of the secondary circuit.

The current flow through the primary circuit under these conditions tends to cause the junction blocks 99 and 107 of the primary circuit to be cooled to a temperature below the temperature of the atmosphere to which the fins 142 are subjected. The tendency is, then, for the junction blocks 122 and 130 of the secondary circuit to be cooled while blocks 118 and 126 of the secondary circuit tend to be maintained at the same atmospheric temperature as are the blocks 95 and 103 of the primary circuit. Thus the temperature differential between the sets of junctions in the secondary circuit will approximate the temperature difference between the sets of junctions in the primary circuit, and a potential will be developed across the load 135 in the same manner as described in connection with the earlier forms of the invention.

Assume now that the radiating fin assembly 141 is associated with a heat sink which is other than the atmosphere. Assume, for example, that the fins 142 are immersed in a body of water such as the ocean which is at a temperature substantially below that of the atmosphere at a particular time. Assume that the radiating fin assembly 145 is open to the atmosphere at this elevated temperature. Now currents passing through the primary will tend to cause the blocks 99 and 107 to be cooled with respect to blocks 95 to 103. These blocks 95 and 103, however, are already being held at a relatively low temperature by the radiating fin assembly 141 and the ocean into which fins 142 are immersed. This means that the blocks 99 and 107 will be brought to an even lower temperature than the temperature to which the fins 142 are subjected. Junction blocks 122 and 130 of the secondary circuit will tend to be brought to this same temperature by heat conduction, and the junction blocks 118 and 126 will be maintained at the higher temperature of the atmosphere to which the fins 146 are subjected. In this situation, the potential developed across the load 135 will be a function not only of the voltage impressed on the primary terminals by the battery 112 but also will be a function of the temperature difference between the primary radiating fin assembly heat sink and the secondary radiating fin assembly heat sink. Even though the output of this form of the transformer will not be directly proportional to the input to the primary terminals, it does demonstrate that only a first set of primary and secondary junctions needs to be in close thermal proximity to each other and to demonstrate that the second set of primary junctions and the second set of secondary junctions do not have to be in close thermal proximity with heat sinks of the same temperature.

What is claimed is:

1. A thermoelectric transformer including a primary circuit having a source of electromotive force and a plurality of dissimilar electrical conducting materials effectively electrically connected to each other at primary junctions and connected across said source in a primary close series loop to cause a current flow in said primary loop operative to cause heating in a first set of said primary junctions and cooling in a second set of said primary junctions; and a secondary circuit having a load and a plurality of dissimilar electric conducting materials effectively electrically connected to each other at secondary junctions and connected across said load in a closed series loop to induce an electrical potential across said load in response to a temperature difference between a first set of said secondary junctions and a second set of said secondary junctions; said first set of primary junctions and said first set of secondary junctions being in heat conducting relationship to each other; and means to tend to maintain the temperature differential between said second set of primary junctions and said second set of secondary junctions at a substantially constant value.

2. The combination as specified in claim 1 wherein at least some of said plurality of dissimilar elements are bonded directly to each other.

3. The combination as specified in claim 1, a plurality of electrically conductive junction blocks having a higher thermal conductivity than at least one of said dissimilar materials, and wherein at least some of said dissimilar materials are effectively electrically connected to each other by being bonded to one of said junction blocks.

4. The combination as specified in claim 1 wherein said means includes a heat conductive path between said second set of primary junctions and said second set of secondary junctions.

5. The combination as specified in claim 1 wherein said means includes a first heat sink at a first relatively fixed temperature in heat conducting relationship to said second set of primary junctions and a second heat sink at a second relatively fixed temperature in heat conducting relationship to said second set of secondary junctions.

6. The combination as specified in claim 5 wherein said first and second fixed temperatures are the same temperature.

7. The combination as specified in claim 5 wherein said first and second fixed temperatures are different temperatures.

8. The combination as specified in claim 5, a plurality of electrically conductive junction blocks having a higher thermal conductivity than at least one of said dissimilar materials, a heat transfer block, wherein said dissimilar materials are effectively electrically connected to each other by being bonded to one of said junction blocks, and wherein said heat transfer block is in heat conductive and electrically insulated relationship to the junction blocks associated with the first set of primary and the first set of secondary junctions.

9. A thermoelectric transformer including a primary circuit having a source of electromotive force and a plurality of dissimilar electrical conducting materials effectively electrically connected to each other at primary junctions and connected across said source in a primary closed series loop to cause a current flow in said primary loop operative to cause heating in a first set of said primary junctions and cooling in a second set of said primary junctions; and a secondary circuit having a load and a plurality of dissimilar electrical conducting materials joined to each other at secondary junctions and connected across said load in a closed series loop to induce an electrical potential across said load in response to a temperature difference between a first set of said secondary junctions and a second set of said secondary junctions; said first set of primary junctions and said first set of secondary junctions being in heat conducting relationship to each other; and said second set of primary junctions and said second set of secondary junctions being in heat conducting relationship to each other.

10. The combination as specified in claim 9, a plurality of electrically conductive junction blocks having a higher thermal conductivity than at least one of said dissimilar materials, and wherein said dissimilar materials are effectively electrically connected to each other by being bonded to one of said junction blocks.

11. The combination as specified in claim 10, first and second heat transfer blocks, wherein said first heat transfer block is in heat conductive and electrically insulated relationship to the junction blocks associated with the first set of primary and first set of secondary junctions, and wherein said second heat transfer block is in heat conductive and electrically insulated relationship to the junction blocks associated with the second set of primary and second set of secondary junctions.

12. A thermoelectric transformer including a primary circuit having a source of unidirectional electromotive force and a plurality of dissimilar electrical conducting materials joined to each other at primary junctions and connected across said source in a primary closed series loop to cause a unidirectional current flow in said primary loop operative to cause heating in a first set of said primary junctions and cooling in a second set of said primary junctions; and a secondary circuit having a load and a plurality of dissimilar electrical conducting materials joined to each other at secondary junctions and connected across said load in a closed series loop to induce a unidirectional electrical potential across said load in response to a temperature difference between a first set of said secondary junctions and a second set of said secondary junctions; said first set of primary junctions and said first set of secondary junctions being in heat conducting relationship to each other; and said second set of primary junctions and said second set of secondary junctions being in heat conducting relationship to each other.

13. A thermoelectric transformer including a primary circuit having a source of unidirectional electromotive force and a plurality of dissimilar electrical conducting materials joined to each other at primary junctions and connected across said source in a primary closed series loop to cause a unidirectional current flow in said primary loop operative to cause heating in a first set of said primary junctions and cooling in a second set of said primary junctions; and a secondary circuit having a load and a plurality of dissimilar electrical conducting materials joined to each other at secondary junctions and connected across said load in a closed series loop to induce a unidirectional electrical potential across said load in response to a temperature difference between a first set of said secondary junctions and a second set of said secondary junctions; said first set of primary junctions and said first set of secondary junctions being in heat conducting relationship to each other; said second set of primary junctions and said second set of secondary junctions being in heat conducting relationship to each other; and said second sets and said first sets being substantially heat insulated from each other.

14. The combination as specified in claim 12, a first heat insulating shell encompassing said first set of said primary junctions and said first set of said secondary junctions and portions of said primary and secondary electrical conducting materials adjacent thereto, and a second heat insulating shell encompassing said second set of primary junctions and said second set of secondary junctions and portions of said primary and secondary electrical conducting materials adjacent thereto.

No references cited.

JOHN F. COUCH, *Primary Examiner.*

W. H. BEHA, *Assistant Examiner.*